April 30, 1963 L. GRYK 3,088,103

MATRIX ENCODERS

Filed Dec. 18, 1958 2 Sheets-Sheet 1

INVENTOR
LEON GRYK
BY Thomas S. Ross
Joseph R. Spalla
ATTORNEYS

INVENTOR
LEON GRYK
BY Thomas S. Ross
Joseph R. Spalla
ATTORNEYS

United States Patent Office 3,088,103
Patented Apr. 30, 1963

3,088,103
MATRIX ENCODERS

Leon Gryk, New Britain, Conn., assignor to Royal McBee Corporation, Port Chester, N.Y., a corporation of New York Filed Dec. 18, 1958, Ser. No. 781,277
4 Claims. (Cl. 340—347)

This invention relates to encoders for converting information into data processing machine language in the form of 5, 6, 7 or 8 level binary codes.

The selection of an encoder for a particular application generally involves a compromise of one or more factors such as cost, size, and reliability. In data processing systems a small compact encoder which can be mounted within the frame of a typewriter, for example, and which is in addition, inexpensive and reliable is highly desirable.

In accordance with the present invention an encoder is provided which is relatively inexpensive to manufacture, operate and maintain; which is capable of being packaged into a small compact unit; and one which employs a minimum of components which are reliable, durable, and long lived.

The above advantageous features are realized in the provision of an encoder comprising a conductor matrix having a first group of $2^e$ conductive lines and a second group of $2^f$ conductive lines; $e$ and $f$ being integers. The first and second groups of lines are selectively connected respectively to one or more of $e$ and $f$ output devices representative of binary levels. $2^{e+f}$ or $2^n$ single pole switches are associated with the conductor matrix and are adapted to connect discrete lines of said first and second groups of lines whereby the output devices connected to those discrete lines will be energized. The switches whereby discrete lines are connected are operated by business machine instrumentalities actuable upon depression of the keys thereof as will be understood by those skilled in the art.

An object of the invention is to provide an encoder which is inexpensive, reliable and long-lived.

Another object of the invention is the provision of a small compact encoder unit suitable for mounting within a business machine frame.

A further object of the invention is to provide an encoder having a minimum of components.

A still further object of the invention is the provision of an encoder wherein the energy requirements are not critical.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
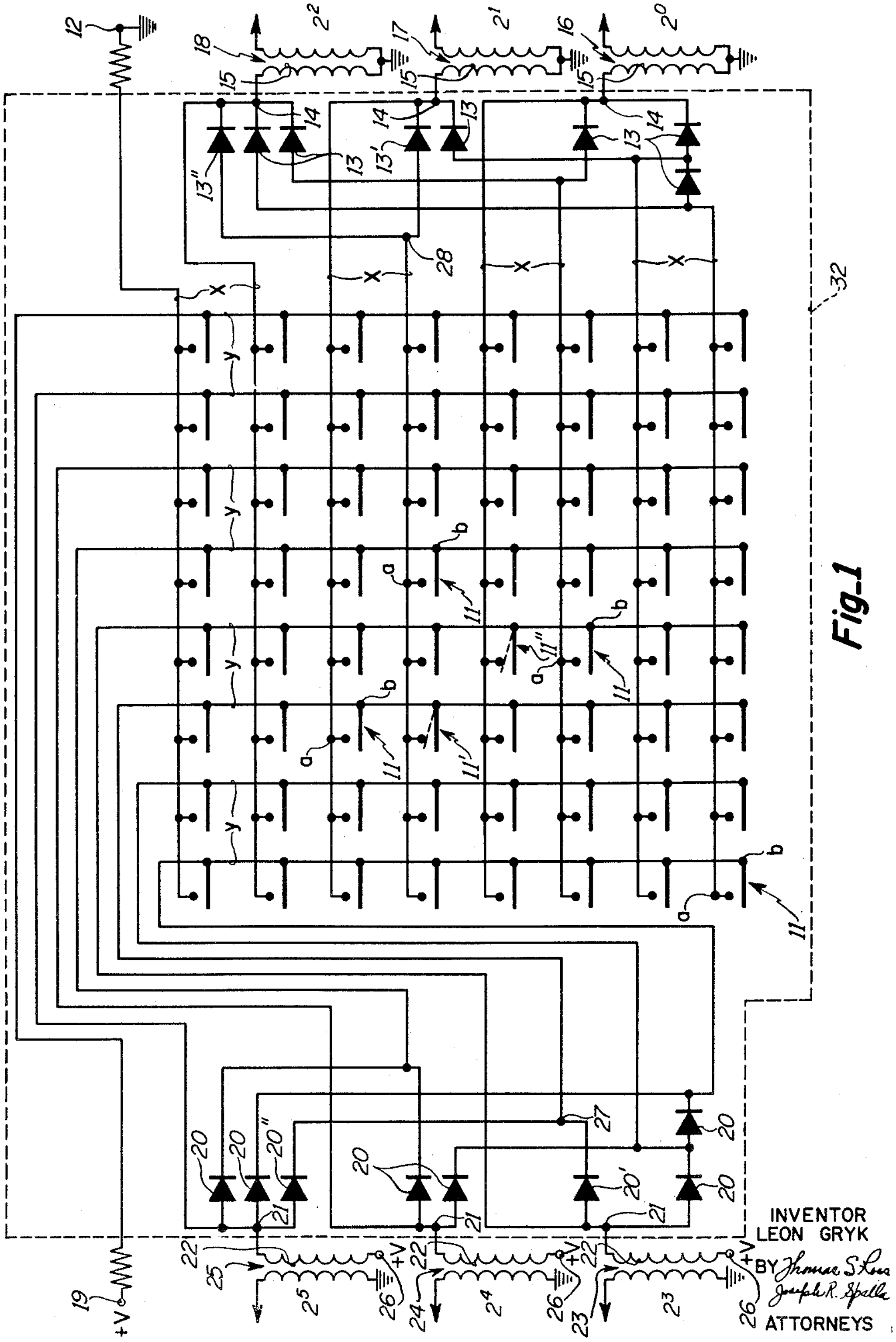
FIG. 1 is a schematic diagram of an encoder in accordance with the invention.

Referring now to the drawings, which illustrate specific embodiments there is shown in FIG. 1 a conductor matrix having a first group of $2^e$ parallel conductors generally designated by reference character $x$, orthogonally disposed with respect to a second group of $2^f$ parallel conductors generally designated by reference character $y$. In accordance with the invention the $x$ and $y$ conductors may be deposited on opposite sides respectively of a dielectric board in accordance with well known printed circuit techniques whereby they will be electrically insulated from one another. As seen in the figure single pole switches generally designated by reference numeral 11 whose terminals are connected within the matrix as at points $a$ and $b$ are adapted to connect a discrete $x$ and a discrete $y$ conductor through points $a$ and $b$. As is apparent up to $2^{e+f}$ or $2^n$ switches may be accommodated. These switches are adapted to be actuated, only one at a time, to a closed position by business machine instrumentalities actuable upon depression of keys on a business machine representative of characters, numerals and machine functions. As is apparent from the drawing a six level encoder adapted to encode up to 64 pieces of information is illustrated wherein both $e$ and $f$ are equal to $n/2$ or three resulting in a symmetrical 8 by 8 conductor matrix.

In the FIG. 1 embodiment one of the $x$ matrix lines is resistively connected to a first voltage source terminal or ground 12 and each of the other seven is connected selectively to one or more of $e$ terminals 14, some by means of diodes to provide the required isolation between terminals 14. Each of the terminals 14 is connected to one end of the primary windings 15 of pulse transformers 16, 17 and 18, the other ends of which are connected to ground. Each of the pulse transformers 16, 17 and 18 corresponds to a binary level, for example binary levels $2^0$, $2^1$, and $2^2$ respectively.

Similarly one of the $y$ matrix lines is resistively connected to a second voltage level source terminal 19 and each of the other seven is connected selectively to one or more of $f$ terminals 21, some by means of diodes 20 to provide the required isolation between terminals 21. Each of the terminals 21 is connected to one end of the primary windings 22 of pulse transformers 23, 24 and 25, corresponding respectively to binary levels $2^3$, $2^4$, and $2^5$, the other ends of which are connected to terminals 26 adapted to be connected to the second voltage level source.

From the foregoing it may be seen that closure of a switch 11, only one of which will be operated at a time, will complete a current path between terminal 19 or terminals 26 to ground through the primary windings of predetermined ones of the pulse transformers. The current flow in the primary windings will induce current pulses in the secondaries thereof which may be utilized for example to effect the energization of punch magnets. For example if switch 11' (shown in dotted lines) is closed, current will flow from terminals 26 through the primary windings of pulse transformers 23 and 25, through diodes 20' and 20'' respectively to a common point 27, the $y$ matrix conductor connected to the terminal $b$ of the closed switch 11', through the switch to the $x$ matrix line connected to terminal $a$ of the switch, to a common point 28 and diodes 13' and 13'' respectively, to ground via the primary windings 15 of transformers 17 and 18. Pulses will therefore be simultaneously developed across the secondary windings of pulse transformers 23, 25, 17 and 18 giving a 011101 output representative of the character, numeral, or function associated with the switch closed.

Figure 2:
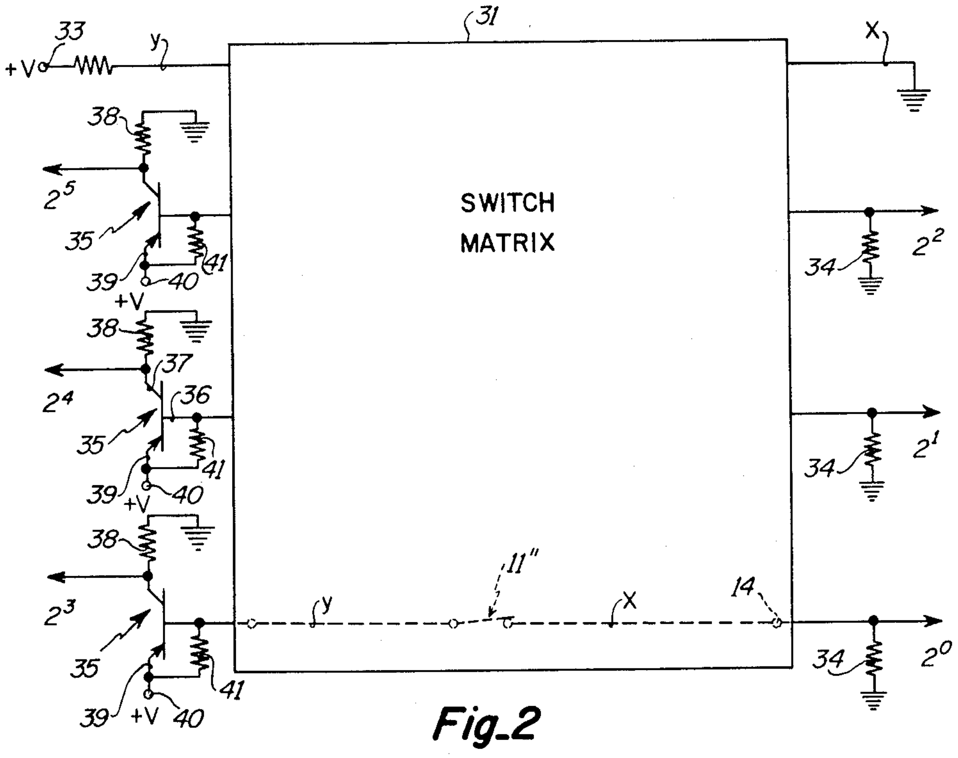
FIG. 2 is a partially schematic block diagram of a preferred embodiment of the invention.

Referring now to FIG. 2 which illustrates a preferred embodiment, the structure within the block 31 is the same as that enclosed within the dotted block 32 in FIG. 1. The corresponding one of the $y$ conductors is connected to a positive voltage source 33 and the corresponding one of the $x$ conductors is connected to ground. In FIG. 2 the output devices connected to terminals 14 in FIG. 1 are resistors 34 instead of the transformers while the output devices connected to terminals 21 in FIG. 1 are transistors 35 preferably of the PNP type; more particularly terminals 21 are connected to the base electrodes 36 of the transistors. The collector electrodes 37 of the transistors are connected to ground through load resistors 38 of the same value as output resistors 34. The emitter electrodes 39 are connected to terminals 40 of the positive voltage source 33. The base and emitter electrodes of each transistor are connected through resistors 41 of very low impedance. As is understood a PNP transistor will not conduct until its base electrode goes negative with respect to its emitter electrode. Normally then with all the switches 11 open, the potential on the base electrodes 36 of the transistors is the same as that on the emitters since the low resistance of resistors 41 effectively shorts the base and emitter electrodes. Hence the transistors 35 are non conductive. The potential at the collector electrodes is therefore ground and the potential at terminals 14 is also ground. When one of the switches 11 is closed, e.g. switch 11'' in FIG. 1 (shown dotted in FIG. 2) the $y$ conductor associated with the $2^3$ level transistor and the $x$ conductor associated with the $2^0$ level resistor will be connected whereby current will flow from source terminal 40 to ground through resistors 41 and 34. The voltage drop across resistor 41 will cause the base electrode of the $2^3$ level transistor 35 to go negative with respect to its emitter electrode whereby it will conduct. Upon conduction the potential at the collector electrode 37 will rise to the potential of source 40. The base of the transistor will also draw current and the resulting divider action will reduce the voltage drop across resistor 41 to a negligible value whereby the voltage drop across resistor 34 will be substantially that of source 40.

Figure 3:
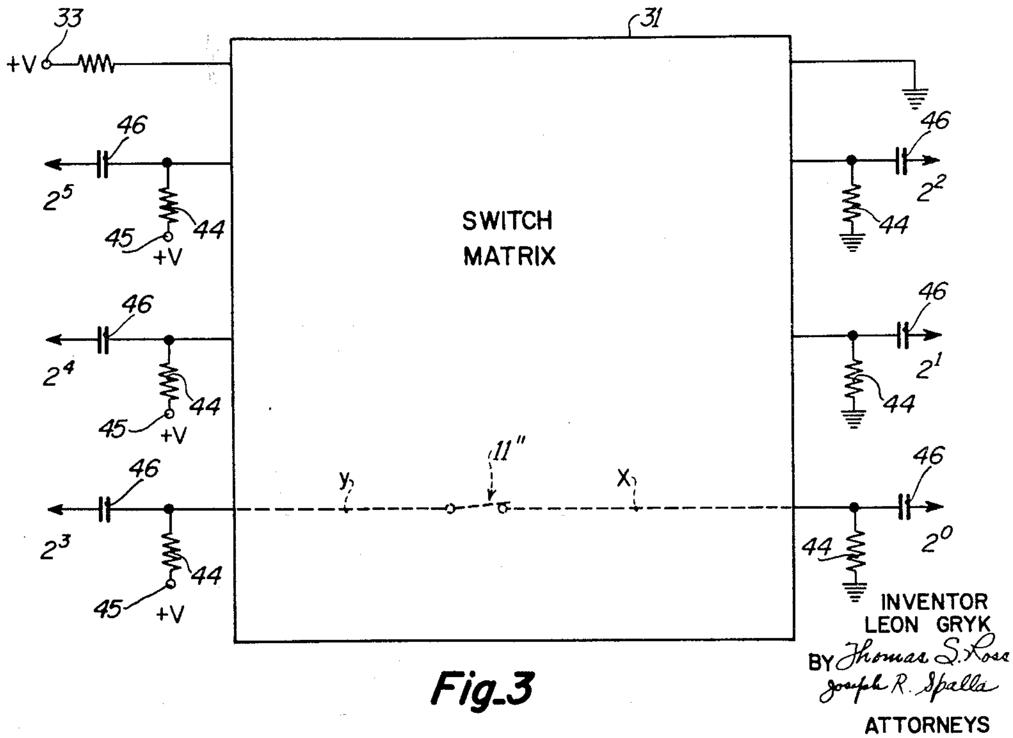
FIG. 3 is a schematic diagram of another embodiment of the invention.

FIG. 3 shows a further embodiment of the invention. In this embodiment resistors 44 are tied to the terminals 14 and 21 of FIG. 1. The resistors representative of binary levels 1, 2 and 4 are returned to ground and those representative of levels 8, 16 and 32 to a positive voltage source terminal 45. The voltage drops across the resistors 44 are coupled via capacitors 46 to any suitable utilization circuit as will be understood by those conversant with the art.

It should be understood therefore that the foregoing disclosure relates only to a preferred embodiment of the invention and that it is intended to cover all changes and modifications of the example of the invention herein chosen for the purposes of the disclosure, which do not constitute departures from the spirit and scope of the invention.

The invention claimed is:

1. An encoder adapted to convert $y$ business machine key functions into $n$ bit impulse combinations where $y$ is equal to $2^{e+f}$ or $2^n$ and $e$ and $f$ are integers greater than zero, comprising a matrix having $2^e$ conductors, $2^f$ conductors, and $2^{e+f}$ normally open single pole switches adapted to be closed one at a time by instrumentalities representative of key functions, each of said switches being arranged to connect a discrete one of said $2^e$ conductors with a discrete one of said $2^f$ conductors, means for connecting one of said $2^e$ and one of said $2^f$ conductors to a first and second reference potential respectively, means for selectively connecting the others of said $2^e$ conductors to one or more predetermined $e$ terminals, $e$ output resistor elements connected between said $e$ terminals and said first reference potential, means for selectively connecting the others of said $2^f$ conductors to one or more predetermined $f$ terminals, $f$ low resistance elements connected between said $f$ terminals and said second reference potential, $f$ transistors, said low resistance elements being connected between the base emitter terminals of said transistors, and $f$ output resistor elements connected between said first reference potential and the collector terminals of said transistors, closure of a switch causing output voltages to be developed across selected output resistor elements.

2. An encoder adapted to convert $y$ business machine key functions into $n$ bit impulse combinations where $y$ is equal to $2^{e+f}$ or $2^n$ and $e$ and $f$ are integers greater than zero, comprising a matrix having $2^e$ conductors, $2^f$ conductors, and $2^{e+f}$ normally open single pole switches adapted to be closed one at a time by instrumentalities representative of key functions, each of said switches being arranged to connect a discrete one of said $2^e$ conductors with a discrete one of said $2^f$ conductors, means for connecting one of said $2^e$ and one of said $2^f$ conductors to a first and second direct current reference potential respectively, means including diodes for selectively connecting each of the others of said $2^e$ conductors to a predetermined combination of said $e$ terminals, $e$ output resistor elements connected between said $e$ terminals and said first direct current reference potential, means including diodes for selectively connecting each of the others of said $2^f$ conductors to a predetermined combination of said $f$ terminals, $f$ low resistance elements connected between said $f$ terminals and said second direct current reference potential, said diodes being poled to pass current between said second and first reference potentials, $f$ transistors, said low resistance elements being connected between the base emitter terminals of said transistors, and $f$ output resistor elements connected between said first reference potential and the collector terminals of said transistors, closure of a switch causing output voltages to be developed across selected output resistor elements.

3. An encoder adapted to convert $y$ business machine key functions into $n$ bit impulse combinations where $y=2^n$ or $2^{e+f}$ and $e$ and $f$ are integers greater than zero, $e$ transistors having emitter base and collector electrodes, $e$ output resistor elements connected between the collector electrode of each transistor and a first reference potential, means for connecting the emitter electrodes to a second direct current reference potential, low resistance elements connecting the base and emitter electrodes of each of said transistors, $f$ output resistor elements, $2^e$ conductors, $2^f$ conductors, means connecting one of said $2^e$ and one of said $2^f$ conductors to said second and said first reference potentials respectively, means including diodes connecting the others of said $2^e$ conductors selectively to predetermined ones of the base electrodes of said transistors, said diodes being poled to pass current between said second and said first reference potentials for isolating said base electrodes from one another, means including diodes connecting the others of said $2^f$ conductors selectively to one end of predetermined ones of said $f$ output resistors, means connecting the other ends of said $f$ output resistors to said first reference potential, said diodes poled to pass current between said second and first reference potentials for isolating said $f$ output resistors from one another, and $2^{e+f}$ switches operable one at a time and adapted to connect a discrete one of said $2^e$ with a discrete one of said $2^f$ conductors.

4. An encoder adapted to convert $y$ business machine key functions into $n$ bit impulse combinations where $y$ is equal to $2^{e+f}$ or $2^n$ and $e$ and $f$ are integers greater than zero, a switching matrix having $2^e$ conductors, $2^f$ conductors and $2^{e+f}$ single pole switches connected between said $2^e$ and $2^f$ conductors, each of said switches adapted when closed to connect a discrete one of said $2^e$ conductors with a discrete one of said $2^f$ conductors, $e$ output devices connected to a first reference potential, $f$ output devices connected to a second reference potential, means connecting one of said $2^e$ and one of said $2^f$ conductors to said first and second reference potentials respectively, and means including diodes connecting each of the others of said $2^e$ and $2^f$ conductors selectively to a combination of said $e$ and $f$ output devices respectively, said diodes poled to pass current between said first and second reference potentials for isolating said $e$ output devices from one another and said $f$ output devices from one another, whereby upon closure of said switches selected ones of said $e$ and $f$ output devices are connected in a discrete circuit between said first and second reference potentials.

(References on following page)

References Cited in the file of this patent

UNITED STATES PATENTS

| | | |
|---|---|---|
| 367,332 | Baxter | July 26, 1887 |
| 1,547,964 | Semat | July 28, 1925 |
| 2,244,700 | Horton | June 10, 1941 |
| 2,627,039 | MacWilliams | Jan. 27, 1953 |
| 2,672,605 | Taylor | Mar. 16, 1954 |
| 2,769,968 | Schultheis | Nov. 6, 1956 |
| 2,844,811 | Burkhart | July 22, 1958 |
| 2,864,962 | Jensen | Dec. 16, 1958 |
| 2,889,537 | Elliott | June 2, 1959 |